(12) United States Patent
Feldmann et al.

(10) Patent No.: US 8,480,928 B2
(45) Date of Patent: Jul. 9, 2013

(54) INORGANIC-ORGANIC COMPOSITE LUMINOPHORE

(75) Inventors: Claus Feldmann, Ettlingen (DE); Marcus Roming, Schiltach (DE)

(73) Assignee: Karlsruher Institut fur Technologie (KIT), Karlsruhe (DE)

( * ) Notice: Subject to any disclaimer, the term of this patent is extended or adjusted under 35 U.S.C. 154(b) by 324 days.

(21) Appl. No.: 12/867,348

(22) PCT Filed: Jan. 7, 2009

(86) PCT No.: PCT/EP2009/000040
§ 371 (c)(1),
(2), (4) Date: Nov. 2, 2010

(87) PCT Pub. No.: WO2009/100800
PCT Pub. Date: Aug. 20, 2009

(65) Prior Publication Data
US 2011/0198538 A1    Aug. 18, 2011

(30) Foreign Application Priority Data
Feb. 16, 2008 (DE) .......... 10 2008 009 541

(51) Int. Cl.
*C09K 11/00* (2006.01)
(52) U.S. Cl.
USPC ...... 252/301.16; 977/776; 977/778; 977/834; 428/690; 501/32; 252/301.35; 252/301.34
(58) Field of Classification Search
USPC .......... 252/301.16, 301.34, 301.35; 977/776, 977/778, 834; 501/12, 32; 428/690
See application file for complete search history.

(56) References Cited

U.S. PATENT DOCUMENTS

2005/0120917 A1    6/2005  Ruger et al.
2007/0077216 A1*   4/2007  Dumousseaux ................ 424/61

FOREIGN PATENT DOCUMENTS

JP    2007-223827    *  9/2007

OTHER PUBLICATIONS

Ocana et al, "Preparation and optical propeties of spherical metal oxide particles containing fluorescent dyes", Journ. non-crystal. soldis, 147&148 (1992), pp. 621-626.*
Kubota, et al., "Electrochemical Study of Flavins, Phenazines, Phenoxazines and Phenothiazines Immobilized on Zirconium Phosphate", Electroanaysis, vol. 11, No. 10-11, 1999, pp. 719-728.
Ocana, et al., "Preparation and Optical Properties of Spherical Metal Oxide Particles Containing Fluorescent Dyes", Journal of Non-Crystalline Solids, North-Holland Physics Publishing, Amsterdam, NL, vol. 147-148, Jan. 1, 1992, pp. 621-626.
Anedda, et al., "Rhodamine 6G-SiO$_2$ Hybrids: A Photoluminescence Study", Journal of Non-Crystalline Solids, vol. 351, 2005, pp. 1850-1854.
International Search Report for PCT/EP2009/000040 dated Mar. 17, 2009.
English Translation of International Preliminary Report on Patentability for PCTEP2009/000040 dated Sep. 7, 2010.

* cited by examiner

*Primary Examiner* — Carol M Koslow
(74) *Attorney, Agent, or Firm* — Jeffrey N. Townes; LeClairRyan

(57) ABSTRACT

The present invention relates to a composite luminophore comprising an inorganic matrix and an organic fluorescent dye, wherein the inorganic matrix is formed from an inorganic compound, and wherein the organic fluorescent dye has one or more functional groups by means of which the fluorescent dye is incorporated into the inorganic matrix, or is bound chemically thereto. The present invention further relates to a process for preparing such a composite luminophore and to the use thereof.

20 Claims, 2 Drawing Sheets

INORGANIC-ORGANIC COMPOSITE LUMINOPHORE

This application claim benefit under 35 U.S.C. §371 to PCT Application No. PCT/EP2009/000040, filed Jan. 7, 2009, which claims priority to DE 10 2008 009 541.9, filed Feb. 16, 2008.

The present invention relates to a composite luminophore comprising an inorganic matrix and an organic fluorescent dye, wherein the inorganic matrix is formed from an inorganic compound selected from the group consisting of metal oxides, metal hydroxides, metal oxide hydroxides, metal phosphates, metal oxide phosphates, metal sulfates, metal oxide sulfates, metal carbonates, metal oxide carbonates, metal silicates, metal oxide silicates, metal borates, metal oxide borates and mixtures thereof, wherein the inorganic compound in each case contains one or more metal cations which may be the same or different and are selected from Li, Na, K, Rb, Cs, Mg, Ca, Sr, Ba, Sc, Y, La, Ti, Zr, V, Nb, Ta, Zn, B, Al, Ga, In, Ge, Bi, the lanthanoids and combinations thereof, wherein the organic fluorescent dye has one or more functional groups selected from hydroxyl groups, sulfate groups, phosphate groups, phosphonic acid groups, phosphinic acid groups, carboxylate groups, silicate groups and borate groups, by means of which the fluorescent dye is incorporated into the inorganic matrix, or is bound chemically thereto. The present invention further relates to a process for preparing such a composite luminophore and to the use thereof.

Luminophore particles or luminophores find various uses in lamps or for illumination (for example in fluorescent lamps, compact fluorescent lamps, sunbed lamps, light-emitting diodes), in visual display units (for example cathode ray tubes, plasma display elements, field emission display elements) or for detection of high-energy radiation (for example in x-ray detectors, in image plates, for tomography). Conventional luminophore particles typically have a particle diameter of more than 1 µm.

However, there is currently particular interest in luminophore particles with particle diameters of less than 100 nm (known as nanoscale luminophores) in fields of application which are not realizable with conventional luminophore particles with particle diameters of more than 1 µm. This is especially true of transparent luminescent layers or markings on glass, paper, metal or plastic substrates (for example as a safety feature on banknotes or identification papers), transparent luminescent fillers in transparent matrices (for example glass or plastic matrices) or biomedical applications, for example in the diagnosis and treatment of tumor disorders, in cell labeling or in fluorescence resonance energy transfer assays (FRET assays). In the aforementioned conventional applications in the display and lighting sector, such luminophore particles with particle diameters of less than 100 nm could become materials of interest with regard to material saving and miniaturization.

However, in order to obtain luminescent nanocrystals with particle diameters of less than 100 nm and of ultrahigh quality, it is first necessary to conduct the reaction at elevated temperature (typically in the range from 150° C. to 250° C.), in order to minimize the number of lattice defects. Secondly, the use of strongly coordinating solvents or stabilizers during the synthesis is essential for control of the particle size, control of the degree of agglomeration, screening of the particle surfaces and increase in the physicochemical stability. In addition, the luminophore particles obtained in this way generally have defects or an amorphous surface, which leads to a significant decrease in the quantum yield. To increase the quantum yield of these luminophore particles obtained in such a way, an inorganic non-luminescent coating or shell can be provided around the luminophore particles to form a core-shell structure (cf., for example, H. Kömpe, H. Borchert, J. Storz, A. Lobo, S. Adam, T. Möller, M. Haase, *Angew. Chem.* 2003, 115, 5672).

The prior art discloses three different groups of nanoscale luminophores, namely (i) nanoscale semiconductor particles or quantum dots, (ii) doped nanoscale luminophores and (iii) non-luminescent nanoparticles, on the surface of which organic fluorescent dyes have been applied.

Nanoscale semiconductor particles known to date are essentially II-VI semiconductor materials, for example ZnS, CdS, CdSe or CdTe, and III-V semiconductor particles, for example AlN, GaN, GaP, GaAs, InN, InP, InAs or InSb. Such semiconductor luminophore particles are also referred to as quantum dots (cf., for example, X. Peng, L. Manna, W. Yang, J. Wickham, E. Scher, A. Kadavanich, A. P. Alivisatos, *Nature* 2000, 404, 59; T. Vossmeyer, L. Katsikas, M. Giersig, I. G. Popov, K. Diesner, A. Chemseddine, A. Eychmüller, H. Weller, *J. Phys. Chem.* 1994, 98, 7665; C. B. Murray, D. J. Norris, M. G. Bawendi, *J. Am. Chem. Soc.* 1993, 115, 8706; M. T. Harrison, S. V. Kershaw, A. L. Rogach, A. Kornowski, A. Eychmüller, H. Weller, *Adv. Mater.* 2000, 12, 123; S. Steckel, J. P. Zimmer, S. Coe-Sullivan, N. E. Scott, V. Bulovic, M. G. Bawendi, *Angew. Chem.* 2004, 116, 2206; *Angew. Chem. Int. Ed.* 2004, 43, 2154). According to the prior art, such luminophores can also be used in the form of core-shell structures (for example CdS@ZnSe or InP@InN).

However, these systems have various disadvantages and restrictions. For instance, the chemical synthesis of nanoscale semiconductor particles is comparatively complex, since protective gas conditions, multistage syntheses and the control and selection of the particle sizes are necessary. Furthermore, semiconductor particles are obtainable only in comparatively small amounts of substance. Moreover, some highly toxic substances have to be used in the synthesis. In addition, the particles then also in some cases contain highly toxic elements such as Cd, Se or Te. Furthermore, these substances are generally also sensitive to hydrolysis, oxidation and/or thermal treatment (even under physiological conditions). To stabilize these systems against hydrolysis and oxidation and to suppress radiationless relaxation processes, complex surface modifications (for example by use of core-shell structures or by covering with specific surface stabilizers) are required. A further restriction is that of the dependence of the luminescence properties (especially the absorption and emission) on the particle size (known as the "quantum size effect"). For this purpose, exactly defined particle diameters with a precision of ±1 nm are required, which makes the synthesis more complex and generally restricts the yield.

Doped nanoscale luminophores (for example $LaPO_4$:Ce, Tb, $Y_2O_3$:Eu, $YVO_4$:Eu, ZnS:Mn) are one important alternative to semiconductor luminophore particles (cf., for example, C. Feldmann, *Adv. Funct. Mater.* 2003, 13, 101; K. Riwotzki, H. Meyssamy, H. Schnablegger, A. Kornowski, M. Haase, *Angew. Chem.* 2001, 113, 574; *Angew. Chem. Int. Ed.* 2001, 40, 573; G. Bühler, C. Feldmann, *Angew. Chem.* 2006, 118, 4982; *Angew. Chem. Int. Ed.* 2006, 45, 4864; J. W. Stouwdam, F. C. J. M. van Veggel, Langmuir 2004, 20, 11763; K. Kömpe, H. Borchert, J. Storz, A. Lobo, S. Adam, T. Möller, M. Haase, *Angew. Chem.* 2003, 115, 5672; *Angew. Chem. Int. Ed.* 2003, 42, 5513). Here too, generally core-shell structures are used (for example $LaPO_4$:Ce, Tb@$LaPO_4$, ZnS:Mn@ZnS, $LaF_3$:Eu@$LaF_3$).

However, these systems too have various disadvantages and restrictions. For instance, the chemical synthesis of doped nanoscale luminophores is likewise quite complex, since protective gas conditions, multistage syntheses and the control and selection of the particle sizes are necessary. Moreover, the materials are obtainable only in comparatively small amounts. The frequently used lanthanoid elements are additionally extremely costly. Just like the nanoscale semiconductor particles, the doped nanoscale luminophores are generally sensitive to hydrolysis, oxidation and/or thermal treatment. To stabilize these systems against hydrolysis and oxidation and to suppress radiationless relaxation processes, complex surface modifications are required. Moreover, the quantum yields of doped nanoscale luminophores are generally below 30%. Although core-shell structures have higher quantum yields, this increases the synthesis complexity considerably. Furthermore, high quantum yields require high-crystallinity defect-free nanoparticles as a necessary prerequisite. In addition, a different luminophore system with a different chemical composition in each case has to be used for each different set of excitation and emission conditions.

A third group of known nanoscale luminophores is that of non-luminescent nanoparticles, on the surface of which organic fluorescent dyes have been applied. This involves chemically binding organic fluorescent dyes (for example phenoxazines, nile red, rhodamine) on the surface of non-luminescent nanoparticles, for example $SiO_2$, $Al_2O_3$ or $TiO_2$ (cf., for example, A. B. Descalzo, M. D. Marcos, C. Monte, R. Martinez-Manez, K. Rurack, *J. Mater. Chem.* 2007, 17, 4716; M. L. Ferrer, F. del Monte, *J. Phys. Chem. B* 2005, 109, 80; C. Konstantinos, D. B. Mitzi, U.S. Pat. No. 6,420,056; A. Malinauskas, T. Ruzgas, L. Gorton, *Bioelectrochem. Bioenergetics* 1999, 49, 21; Y. Cao, J. Cao, M. Zheng, J. Liu, G. Ji, H. Ji, *J. Nanosci. Nanotechnol.* 2007, 7, 504).

However, the synthesis of these nanoparticles is again comparatively complex, since the nanoparticles first have to be prepared and then the organic fluorescent dyes have to be anchored on the surface. The adhesion of the organic fluorescent dyes on the surface of the nanoparticles is, however, frequently limited, and even the addition of acid/bases can cause the release of the organic fluorescent dyes. Moreover, the organic fluorescent dyes can be altered or destroyed by the action of chemicals, such as acids, bases or redox-active substances, or by the action of UV radiation or heat. Furthermore, such composites with an organic fluorescent dye on the surface of a non-luminescent inorganic matrix may be in the form of mesoporous networks with fully aggregated and no longer separable nanoparticles. Moreover, the surface properties of the nanoparticles are determined by the organic fluorescent dyes, which can lead under some circumstances to limited dispersibility in polar or nonpolar dispersants. Finally, the luminescence intensity is low as a result of the comparatively small number of luminescence sites per unit volume (owing to a non-luminescent core and a small number of fluorescent dye molecules on the surface).

It is therefore an object of the present invention to overcome the aforementioned disadvantages of nanoscale luminophores known in the prior art and to provide a nanoscale luminophore which is significantly less sensitive to hydrolysis and the action of acids, bases, redox-active substances and heat than conventional luminophores without any need for a complex surface modification, which has a high luminescence intensity and high quantum yields, and of which greater amounts of substance are readily obtainable by a simple synthesis strategy, without any requirement for the use of costly or toxic chemicals or elements. Furthermore, the nanoscale luminophore should be prepared in agglomerate-free form with a homogeneous particle size and morphology, and likewise be redispersible in agglomerate-free form in different liquid phases.

This object is achieved by the embodiments characterized in the claims.

More particularly, a composite luminophore is provided, comprising an inorganic matrix and an organic fluorescent dye, wherein the inorganic matrix is formed from an inorganic compound selected from the group consisting of metal oxides, metal hydroxides, metal oxide hydroxides, metal phosphates, including the hydrogenphosphates and dihydrogenphosphates, metal oxide phosphates, metal sulfates, metal oxide sulfates, metal carbonates, metal oxide carbonates, metal silicates, metal oxide silicates, metal borates, metal oxide borates and mixtures thereof, wherein the inorganic compound in each case contains one or more metal cations which may be the same or different and are selected from Li, Na, K, Rb, Cs, Mg, Ca, Sr, Ba, Sc, Y, La, Ti, Zr, V, Nb, Ta, Zn, B, Al, Ga, In, Ge, Bi, the lanthanoids and combinations thereof, wherein the organic fluorescent dye has one or more functional groups selected from hydroxyl groups, sulfate groups, phosphate groups, carboxylate groups, silicate groups and borate groups, by means of which the fluorescent dye is incorporated into the inorganic matrix.

In the context of the present invention, the term "inorganic matrix" is understood to mean an inorganic solid which serves as a support material and to which one or more substances may be chemically attached. The matrix of the inventive composite luminophore is formed from an inorganic compound selected from the group consisting of metal oxides, metal hydroxides, metal oxide hydroxides, metal phosphates, metal oxide phosphates, metal sulfates, metal oxide sulfates, metal carbonates, metal oxide carbonates, metal silicates, metal oxide silicates, metal borates, metal oxide borates, metal hydrogencarbonates, metal hydrogenphosphates and mixtures thereof. The aforementioned inorganic compounds may each contain one or more metal cations. These may each be the same or different, i.e. compounds which contain different metal cations are also included within the scope of the present invention. The metal cations are selected from Li, Na, K, Rb, Cs, Mg, Ca, Sr, Ba, Sc, Y, La, Ti, Zr, V, Nb, Ta, Zn, B, Al, Ga, In, Ge, Bi, Pb the lanthanoids and combinations thereof.

In a preferred embodiment of the present invention, the inorganic compound is a metal phosphate or a metal oxide phosphate. In this case, the metal cation is preferably selected from Mg, Ca, Sr, Ba, Sc, Y, La, Zr, Zn, Al, Bi, a lanthanoid and combinations thereof. In another preferred embodiment of the present invention, the inorganic compound is a metal sulfate or a metal oxide sulfate. In this case, the metal cation is preferably selected from Mg, Ca, Sr, Ba, Zn and combinations thereof. In a further preferred embodiment of the present invention, the inorganic compound is a metal carbonate or a metal oxide carbonate. In this case, the metal cation is preferably selected from Mg, Ca, Sr, Ba, Zn and combinations thereof. In a further preferred embodiment of the present invention, the inorganic compound is a metal silicate or a metal oxide silicate. In a further preferred embodiment, the inorganic compound is a metal borate or a metal oxide borate. In a particularly preferred embodiment of the present invention, the inorganic compound is selected from the group consisting of $MgCO_3$, $CaCO_3$, $SrCO_3$, $BaCO_3$, $PbCO_3$, $MgSO_4$, $CaSO_4$, $SrSO_4$, $BaSO_4$, $PbSO_4$, $Mg_3(PO_4)_2$, $Ca_3(PO_4)_2$, $Sr_3(PO_4)_2$, $Ba_3(PO_4)_2$, $Mg_3(PO_4)_2$, $LaPO_4$, $ScPO_4$, $GaPO_4$, $InPO_4$, $ZrO(HPO_4)$, $ZrO(H_2PO_4)_2$, $Zr_3(PO_4)_4$, including $Zr(HPO_4)_2$ and $Zr(H_2PO_4)_4$, and combinations thereof. In an even more preferred embodiment, the inorganic matrix is formed from a compound selected from $CaCO_3$, $LaPO_4$, $ZrO(HPO_4)$, $ZrO(H_2PO_4)_2$, and $Zr_3(PO_4)_4$, including $Zr(HPO_4)_2$ and $Zr(H_2PO_4)_4$.

The inorganic compound is generally sparingly soluble. In the context of the present invention, sparingly soluble compounds are understood to mean those compounds which have a molar solubility of $\leq 10^{-2}$ mol/l. The sparingly soluble compounds preferably have a molar solubility of $\leq 10^{-4}$ mol/l. This is advantageous with regard to the synthesis of the inventive composite luminophore, since the inorganic matrix can thus be precipitated from soluble precursor compounds together with the organic fluorescent dye. In a particularly preferred embodiment, the inorganic matrix is formed from a compound selected from the group consisting of sparingly soluble metal carbonates, sparingly soluble metal phosphates and sparingly soluble metal sulfates.

The inventive composite luminophore has the advantage that the inorganic matrix is formed from essentially low-toxicity inorganic compounds. In contrast, the luminophores described in the prior art frequently comprise toxic elements, for example Cd, Se or Te.

The inorganic matrix may have either a crystalline structure or a non-crystalline or x-ray-amorphous structure. In a preferred embodiment of the present invention, the inorganic matrix has a crystalline structure. This is advantageous especially with regard to the quantum yield of the luminophore particles. In another preferred embodiment, the inorganic matrix has an x-ray-amorphous structure. This is advantageous with regard to a simplified synthesis, since amorphous nanoparticles can be obtained without any great synthetic complexity.

In a preferred embodiment of the present invention, the inorganic matrix is additionally doped with one or more cations and/or anions. Doping the matrix makes it possible to modify the luminescence properties of the inventive luminophore, since, after excitation of the organic fluorescent dye, there is full or partial energy transfer to the dopant, such that emission originating from the dopant can be observed. It is additionally possible that the dopant causes altered excitation of the inventive composite luminophore. The doping may be within any suitable concentration range. The doping is preferably within a concentration range from 5 ppm to 50 mol %, more preferably within a concentration range from 0.1 to 5.0 mol %. The inorganic matrix is preferably doped with a lanthanoid selected from Ce, Pr, Nd, Sm, Eu, Gd, Tb, Dy, Ho, Er, Tm, Yb and Lu, a transition metal selected from Cr, Mn, Cu, Zn, Y, Ag and Cd, a main group element selected from Sn, Sb, Pb and Bi, and a complex anion selected from $[VO_4]^{3-}$, $[MoO_4]^{3-}$ and $[WO_4]^{3-}$.

The inventive composite luminophore further comprises an organic fluorescent dye which has one or more functional groups selected from hydroxyl groups, sulfate groups, phosphate groups, phosphonic acid groups, phosphinic acid groups, carboxylate groups, silicate groups and borate groups, by means of which the fluorescent dye is incorporated into the inorganic matrix. The organic fluorescent dye is preferably selected from the group consisting of 1,1'-diethyl-2,2'-cyanine iodide, 1,2-diphenylacetylene, 1,4-diphenylbutadiene, 1,4-diphenylbutadiene, 1,6-diphenylhexatriene, 2,5-diphenyloxazole, 2-methylbenzoxazole, 4',6-diamidino-2-phenylindole, (DAPI), 4-(dicyanomethylene)-2-methyl-6-(p-dimethylaminostyryl)-4H-pyran (DCM), 4-dimethylamino-4'-nitrostilbene, 5,10,15-triphenylcorrole, 5,10,15-tris(pentafluorophenyl)corrole, 5,10-diarylchlorin, copper 5,10-diarylchlorin, copper 5,10-diaryloxochlorin, magnesium 5,10-diaryloxochlorin, 5,10-diaryloxochlorin, zinc 5,10-diarylchlorin, zinc 5,10-diaryloxochlorin, 7-benzylamino-4-nitrobenz-2-oxa-1,3-diazole, 7-methoxycoumarin-4-acetic acid, 9,10-bis(phenylethynyl)anthracene, 9,10-diphenylanthracene, acridine orange, acridine yellow, adenine, anthracene, anthraquinone, auramine O, azobenzene, bacteriochlorophyll A, benzoquinone, beta-carotene, bilirubin, biliverdin dimethyl ester, biphenyl, bis(5-mesityldipyrrinato)zinc, bis(5-phenyldipyrrinato)zinc, boron subphthalocyanine chloride, chlorin E6, chlorophyll A, chlorophyll B, cis-stilbene, coumarin and derivatives thereof, cresyl violet perchlorate, cryptocyanine, crystal violet, cytosine, dansylglycine, diprotonated tetraphenylporphyrin, eosin and derivatives thereof, ethyl (p-dimethylamino)benzoate, ferrocene, fluorescein and derivatives thereof, guanine, hematine, histidine, Hoechst 33258, indocarbocyanine and derivatives thereof, lucifer yellow CH, magnesium octaethylporphyrin, magnesium phthalocyanine, magnesium tetramesitylporphyrin, magnesium tetraphenylporphyrin, malachite green, merocyanine, N,N'-difluoroboryl-1,9-dimethyl-5-(4-iodophenyl)dipyrrin, N,N'-difluoroboryl-1,9-dimethyl-5-[(4-(2-trimethylsilylethynyl), N,N'-difluoroboryl-1,9-dimethyl-5-phenyldipyrrin, tetraphenylporphyrin, naphthalene, nile blue, nile red, octaethylporphyrin, oxacarbocyanine and derivatives thereof, oxazine and derivatives thereof, p-quaterphenyl, p-terphenyl, perylene and derivatives thereof, phenol, phenylalanine, phenyldipyrrin, pheophorbide, phthalocyanine, pinacyanol iodide, piroxicam, porphin, proflavin, protoporphyrin IX dimethyl ester, pyrene, pyropheophorbide and derivatives thereof, pyrrole, quinine, rhodamine and derivatives thereof, riboflavin, bengal red, squarylium dye III, TBP-beta-octa(COOBu)-Fb, TBP-beta-octa(COOBu)-Pd, TBP-beta-octa(COOBu)-Zn, TBP-meso-tetraphenyl-beta-octa(COOMe)-Fb, TBP-meso-tetraphenyl-beta-octa(COOMe)-Pd, TBP-meso-tetraphenyl-beta-octa(COOMe)-Zn, TCPH-meso-tetra(4-COOMe-phenyl)-Fb, TCPH-meso-tetra(4-COOMe-phenyl)-Pd, TCPH-meso-tetra(4-COOMe-phenyl)-Zn, tetra-t-butylazaporphin, tetra-t-butylnaphthalocyanine, tetrakis(2,6-dichlorophenyl)porphyrin, tetrakis(o-aminophenyl)porphyrin, tetramesitylporphyrin, tetraphenylporphyrin, tetraphenylsapphyrin, thiacarbocyanine and derivatives thereof, thymine, trans-stilbene, tris(2,2'-bipyridyl)ruthenium(II), tryptophan, tyrosine, uracil, vitamin B12, zinc octaethylporphyrin, phthalocyanine and derivatives thereof, porphyrin and derivatives thereof, for example tetra(o-amidophosphonatophenyl)porphynin, and umbelliferone. The organic fluorescent dyes which as such do not have a hydroxyl group, sulfate group, phosphate group, phosphonic acid group, phosphinic acid group, carboxylate group, silicate group or borate group have been modified with at least one of these functional groups. Corresponding processes for functionalizing such organic fluorescent dyes are known to those skilled in the art.

The organic fluorescent dye is incorporated into the inorganic matrix via the functional groups of the fluorescent dye. In a preferred embodiment, the organic fluorescent dye is bonded to the inorganic matrix via one or more chemical bonds, in which case the chemical bond may be a covalent bond, a hydrogen bond or an ionic bond. In this context, it is possible either for several chemical bonds or for combinations of the different bond types to occur between organic fluorescent dye and inorganic matrix. In one embodiment of the present invention, the bond between inorganic matrix and organic fluorescent dye consists of one or more ether, ester or amide bonds, and combinations thereof. Ester groups can be formed either via carboxylic acid functions or via phosphoric acid or sulfonic acid groups. The functional group via which the fluorescent dye is incorporated into the inorganic matrix is more preferably selected from the group consisting of —COOH, —OH, —P(O)$_2$OH, —OP(O)$_2$OH, —S(O)$_2$OH and anions thereof. The use of a fluorescent dye with these functional groups is especially advantageous in conjunction with an inorganic matrix formed from a compound selected from the group consisting of sparingly soluble metal carbonates, sparingly soluble metal phosphates and sparingly soluble metal sulfates.

In a further preferred embodiment of the present invention, the organic fluorescent dye is selected from the group consisting of riboflavin 5'-monophosphate sodium salt, rhodamine, perylene, coumarin and umbelliferone, the latter having been functionalized with at least one hydroxyl group, sulfate group, phosphate group, carboxylate group, silicate group, borate group or combinations thereof.

According to the present invention, one or more organic fluorescent dyes may be present in the inventive composite dye. In this way, different excitation and emission conditions can be established in each case with the same inorganic matrix, in which case it is necessary merely to appropriately select and incorporate the organic fluorescent dye or the organic fluorescent dyes.

The inventive luminophore may have any suitable particle size. In a preferred embodiment, the inventive luminophore is nanoscale and has a particle diameter in the range from 1 to 100 nm. Particular preference is given to a particle diameter in the range from 1 to 20 nm. Furthermore, the inventive luminophore preferably has a virtually monodisperse size distribution in the range of ±30%, more preferably in the range of ±5%. In addition, the inventive composite luminophore preferably has a low degree of agglomeration, more preferably with a size distribution in the range of ±30%, even more preferably in the range of ±5%. The prior art discloses suitable processes for determining the particle diameter and the monodisperse size distribution.

In a further embodiment, the inorganic matrix of the inventive composite luminophore has a core-shell structure. It is particularly preferred in this context that the core comprises the organic fluorescent dye, while the shell does not comprise any organic fluorescent dye. Shell and core may be formed either from the same inorganic compound or from different inorganic compounds. The use of a core-shell structure is advantageous in the case of the inventive composite luminophore with regard to an increase in hydrolysis stability. For instance, the application of a shell of an inorganic compound can effectively prevent the bond via which the fluorescent dye is bonded to the inorganic matrix from being hydrolyzed, and subsequently the fluorescent dye from being gradually washed out of the core of the inventive composite luminophore.

Typically, the quantum yield of the inventive composite luminophore corresponds essentially to the quantum yield of the organic fluorescent dye present in the composite luminophore in the unbound form thereof. Compared to a corresponding surface-modified luminophore particle, the inventive composite luminophore thereof has the advantage of an increased quantum yield. For instance, the quantum yield (i.e. the ratio of the number of photons emitted to the number of photons absorbed) for the composite luminophore is determined essentially by the fluorescent dye. When the latter is present only at the surface, as in the case of the surface-modified luminophore particles, the quantum yield is typically reduced by up to 5% as a result of surface defects. The crucial advantage of the inventive composite luminophore is accordingly the considerably higher concentration of fluorescent dye and hence of fluorescence sites, such that the total number of photons and hence the light intensity or luminescence intensity is considerably higher. In this way, a significantly better contrast can be achieved. Furthermore, the use of organic fluorescent dyes in the inventive composite luminophore is advantageous owing to the generally higher quantum yields compared to doped nanoscale luminophores.

According to the present invention, it is possible to establish different excitation and emission properties in each case with the same inorganic matrix by the selection and the incorporation of a corresponding organic fluorescent dye. The excitation of the inventive composite luminophore is preferably in the range from 100 to 800 nm, and the emission in the range from 200 to 2000 nm. In general, excitation is effected by a light-emitting diode which emits blue light (i.e. 350 to 480 nm), and the organic fluorescent dye or the inventive composite luminophore emits in the visible spectral range between blue and red (i.e. 480 to 780 nm). In another embodiment, the excitation is effected in the form of UV light (i.e. 100 to 380 nm). In the case of the inventive composite luminophore, the luminescence intensity under excitation conditions preferably decreases less significantly over the duration of excitation compared to the unbound organic fluorescent dye; more preferably, the luminescence intensity does not decrease over the duration of excitation, more particularly in the case of excitation with a light-emitting diode. For instance, the luminescence intensity preferably does not decrease by more than 10% under the action of UV light, and by not more than 1% under the action of daylight.

The present invention further relates to a process for preparing the inventive composite luminophore, comprising the steps of (a) the providing of a solution of an organic fluorescent dye having one or more functional groups selected from hydroxyl groups, sulfate groups, phosphate groups, phosphonic acid groups, phosphinic acid groups, carboxylate groups, silicate groups and borate groups, which solution optionally further comprises at least one anion selected from hydroxide, sulfate, phosphate, carbonate, carboxylate, silicate and borate, (b) the providing of a solution of a soluble metal salt comprising metal cations which may be the same or different and are selected from Li, Na, K, Rb, Cs, Mg, Ca, Sr, Ba, Sc, Y, La, Ti, Zr, V, Nb, Ta, Zn, B, Al, Ga, In, Ge, Bi, the lanthanoids and combinations, (c) the combining of the two solutions while stirring in order to precipitate the composite luminophore, and (d) the isolating and/or purifying of the precipitated composite luminophore.

Step (a) of the process according to the invention comprises the providing of a solution of the organic fluorescent dye. The latter has already been described above. In addition, this solution may optionally further comprise at least one anion selected from hydroxide, sulfate, phosphate, carbonate, carboxylate, silicate and borate. For example, such an anion is not required when the soluble metal salt used in step (b) of the process according to the invention is ZrOCl$_2$. If used, this anion may be present together with a cation in the form of a dissolved salt, for example in the form of dissolved alkali metal hydroxide, alkali metal sulfate, alkali metal phosphate, alkali metal carboxylate, alkali metal carbonate, alkali metal silicate or alkali metal borate. The alkali metal is preferably sodium or potassium. The anion may also be present in the solution in the form of the corresponding acid. In one embodiment of the present invention, the solution for providing one of the aforementioned anions comprises an acid selected from the group consisting of sulfuric acid, phosphoric acid, a carboxylic acid or boric acid. The carboxylic acid is preferably formic acid, acetic acid, propionic acid or oxalic acid. The carboxylate is accordingly preferably formate, acetate or propionate. The solution more preferably comprises phosphate as an anion, and preference is given to using phosphoric acid to provide this anion.

The solvent used may be any suitable solvent. The solvent used is preferably water, an alcohol, an ionic liquid or a mixture of two or more of these solvents. Preferred alcohols for use as solvents are methanol, ethanol, propanol and isopropanol. Preferred ionic liquids are formed from cations and anions, the anions being selected from the group consisting of chloride, bromide, iodide, methanesulfonate, hydrogensulfate, octylsulfate, thiocyanate, p-toluenesulfonate, tetrafluoroborate, hexafluorophosphate, bis(penta-fluoroethyl)phosphinate, bis[oxalate(2-)]borate, bis[1,2-benzenediolato(2-)-O,O']borate, trifluoroacetate, trifluorosulfonate, dicyanamide, tris(trifluoromethylsulfonyl)methide, bis(trifluoro-methylsulfonyl)imide, tris(pentafluoroethyl)trifluorophosphate, ethylsulfate, diethylphosphate, 2-(2-methoxyethoxy)ethylsulfate, butylsulfate and combinations thereof, and the cations from the group consisting of monosubstituted imidazolium derivatives such as 1-methylimidazolium, disubstituted imidazolium derivatives such as 1,3-dimethylimidazolium, 1-ethyl-3-methylimidazolium, 1-butyl-3-methylimidazolium, 1-propyl-3-methylimidazolium, 1-hexyl-3-methylimidazolium, 3-methyl-1-octylimidazolium, 1-decyl-3-methylimidazolium, 1-dodecyl-3-methylimidazolium, 3-methyl-1-tetradecylimidazolium, 1-hexadecyl-3-methylimidazolium, 1-octadecyl-3-methylimidazolium, 1-benzyl-3-methylimidazolium, 1-phenylpropyl-3-methylimidazolium, trisubstituted imidazolium derivatives such as 1,2,3-trimethylimidazolium, 1-ethyl-2,3-dimethylimidazolium, 1-butyl-2,3-dimethylimidazolium, 1-propyl-2,3-dimethylimidazolium, 1-hexyl-2,3-dimethylimidazolium, 1-hexadecyl-2,3-dimethylimidazolium, pyridinium derivatives such as N-ethylpyridinium, N-butylpyridinium, N-butyl-3,4-dimethylpyridinium, N-butyl-3,5-dimethylpyridinium, N-butyl-3-methylpyridinium, N-butyl-4-methylpyridinium, N-hexylpyridinium, N-octylpyridinium, 1-ethyl-3-hydroxymethylpyridinium, pyrrolidinium derivatives such as 1,1,-dimethylpyrrolidinium, 1-ethyl-1-methylpyrrolidinium, 1,1-dipropylpyrrolidinium, 1,1-dibutylpyrrolidinium, 1-butyl-1-methylpyrrolidinium, 1,1-dihexylpyrrolidinium, 1-hexyl-1-methylpyrrolidinium, 1-methyl-1-octylpyrrolidinium, phosphonium derivatives such as tetrabutylphosphonium, trihexyl(tetradecyl)phosphonium, ammonium derivatives such as tetramethylammonium, tetraethylammonium, tetrabutylammonium, methyltrioctylammonium, ethyldimethylpropylammonium, cyclohexyltrimethylammonium, ethanolammonium, guanidinium derivatives such as guanidinium, N,N,N',N'-tetramethyl-N''-ethylguanidinium, N,N,N',N',N''-pentamethyl-N''-propylguanidinium, N,N,N',N',N''-pentamethyl-N''-isopropylguanidinium, hexamethylguanidinium, isouronium derivatives such as O-methyl-N,N,N',N'-tetramethylisouronium, S-ethyl-N,N,N',N'-tetramethylisothiouronium, sulfonium derivatives such as diethylmethethylsulfonium, and combinations thereof. An ionic liquid particularly preferred as the solvent is [MeBu$_3$N][(SO$_2$CF$_3$)$_2$N].

Step (b) of the process according to the invention comprises the providing of a solution of a soluble metal salt comprising metal cations which may be the same or different and are selected from Li, Na, K, Rb, Cs, Mg, Ca, Sr, Ba, Sc, Y, La, Ti, Zr, V, Nb, Ta, Zn, B, Al, Ga, In, Ge, Bi, the lanthanoids and combinations. The solvent used may be any suitable solvent. Preference is likewise given to using the aforementioned solvents, namely water, alcohols, ionic liquids and mixtures of two or more of these solvents. In a particularly preferred embodiment of the present invention, water is used as the solvent. The metal salt used may be any salt which is soluble in the solvent used. Suitable metal salts are known to those skilled in the art. The metal salts used may preferably be the halides, nitrates and sulfates of the aforementioned metals, provided that they are soluble in the solvent used in each case. In a particularly preferred embodiment of the present invention, lanthanum trichloride or zirconyl chloride is used as the metal salt.

Step (c) of the process according to the invention comprises the combining of the two solutions while stirring. In this way, the inventive composite luminophore is precipitated. In the step of combining, the two solutions may have any suitable temperature. In a preferred embodiment of the present invention, at least one of the two solutions has, or both solutions have, a temperature in the range from room temperature to 85° C., more preferably a temperature in the range from 40° C. to 75° C. The two solutions are preferably combined rapidly, i.e. within a period of not more than 10 seconds, preferably within a period of not more than 5 seconds.

Step (d) of the process according to the invention comprises the isolating and/or purifying of the precipitated composite luminophore. This isolating and/or purifying can be effected by all suitable processes. Such processes are known in the prior art.

Preference is given to isolating and/or purifying the luminophore particles by a process selected from the group consisting of centrifugation techniques, dialysis techniques, phase transfer techniques, chromatography techniques, ultrafiltration techniques, washing techniques and combinations thereof. For example, the isolating and purifying can be effected by diluting the reaction mixture obtained in step (c) or the reaction dispersion obtained with one of the above-described solvents and then centrifuging. In this way, full removal of the reaction medium is possible in a simple manner. The aforementioned processes for isolating and/or purifying the luminophore particles may also be performed in combination and/or repeatedly.

In a preferred embodiment, the process according to the invention comprises, before or after step (d) of isolating and/or purifying the composite luminophore, a further step of coating the luminophore particles with an inorganic shell to form core-shell particles. Corresponding processes for producing core-shell particles are known in the prior art. It is particularly preferred that the core comprises the organic fluorescent dye, while the shell does not comprise any fluorescent dye. Shell and core may either be formed from the same inorganic compound or from different inorganic compounds.

The process according to the invention can be used to prepare a composite luminophore which is nanoscale and has a particle diameter in the range from 1 to 100 nm. Particular preference is given to using the process according to the invention to obtain a composite luminophore with a particle diameter in the range from 1 to 20 nm. In addition, the luminophore obtained by the process according to the invention preferably has a virtually monodisperse size distribution in the range of ±30%, more preferably in the range of ±5%. In addition, the luminophore obtained by the process according to the invention preferably has a low degree of agglomeration, more preferably with a size distribution in the range of ±30%, more preferably in the range of ±5%. The composite luminophore obtained by the process according to the invention is generally in amorphous form.

In order to obtain nanoscale particles by the process according to the invention, it is additionally advantageous, during the preparation process, to adjust the equilibrium between the endothermic process of nucleation and the exothermic process of nucleus growth in favor of nucleation. Corresponding processes are known to those skilled in the art, for example from colloid chemistry. For example, the reactants can be heated somewhat for this purpose. However, it is additionally also advantageous to stabilize the surfaces of the particles formed by means of charges in order to minimize possible nucleus growth. This can be effected, for example, by a suitable setting of the pH. Furthermore, rapid combining promotes the formation of nanoscale particles.

The process according to the invention for preparing the composite luminophore has significant advantages compared to the prior art. For instance, the process according to the invention for preparing the composite luminophore is comparatively simple and consists of only a few process steps. Protective gas conditions and specific control and selection of the particle size are not required. With the aid of the process according to the invention, furthermore, greater amounts of substance are also readily obtainable. In addition, the chemicals or elements for use are generally less expensive than those which are used in the processes known in the prior art for preparing luminophore particles. In addition, the composite luminophore can be prepared by the process according to the invention with homogeneous particle size and particle morphology.

The present invention further relates to the use of the inventive composite luminophore as a marking, safety feature, for commercial purposes, for illumination, data storage and/or data replication. Preference is given to excitation of the inventive composite luminophore with a light-emitting diode. In a particularly preferred embodiment of the present invention, the luminescent properties of a light-emitting diode are altered by the inventive composite luminophore. Particular preference is given to use for white light-emitting diodes, in which case the emission radiation of the light-emitting diode is partly absorbed by the composite luminophore and subsequently converted such that the resulting overall emission is white light.

The present invention further relates to the medical-pharmaceutical-biological use of the inventive composite luminophore, especially in the sector of diagnostics, treatment, as a contrast agent or as a medicament. The composite luminophore may be used, for example, in the form of transparent, luminescent and biocompatible dispersions or powders. The preparation process according to the invention is advantageous specifically for such applications, since highly toxic components can be avoided during the synthesis. Such luminescent dispersions or powders can be used, for example, for tumor diagnosis, tumor treatment, for labeling plaques, for cell labeling, in FRET assays or in immunoassays.

The present invention further relates to the use of the inventive composite luminophore for coating onto or for embedding into a substrate, wherein the substrate is selected from the group consisting of a paper substrate, polymer substrate, glass substrate, metal substrate and ceramic substrate, for example for diagnosis, treatment, as a contrast agent, as a marking, safety feature, for commercial purposes, for illumination, data storage and/or data replication.

Particular preference is given to the embedding of the composite luminophore in the form of a transparent and luminescent layer or film. Such luminescent layers or films can be used, for example, as a marking, safety feature, for commercial purposes, for illumination, data storage or data replication.

The inventive composite luminophore can also be provided in the form of a dispersion. For instance, the inventive composite luminophore has the advantage that it can be redispersed in agglomerate-free form in different liquids. The dispersion medium may be any suitable dispersion medium. The dispersion medium is preferably selected from the group consisting of water, aldehydes, esters, ethers, thiols such as decanethiol, aromatics, alkanes such as dodecane, haloalkanes, alcohols such as methanol and ethanol, polyols such as glycerol and diethylene glycol, carboxylic anhydrides, amines such as octylamine and pyridine, amides such as dimethylformamide, imides, ketones, carboxylic acids and sulfonic acids, such as octanoic acid and dodecyl sulfate, sulfoxides such as dimethyl sulfoxide, phosphines such as trioctylphosphine (TOP), phosphine oxides such as trioctylphosphine oxide (TOPO), phosphates such as octyl phosphate, polymers such as polyacrylates, polyamines, polyurethanes, polyureas, phenolic resins, amino resins and epoxy resins, and combinations thereof, liquid ammonia, liquid sulfur dioxide, liquid carbon dioxide, solutions of an alkali metal, alkaline earth metal, ammonium and tetramethylammonium salt, such as halides, carbonates, hydrogencarbonates, sulfates, hydrogensulfates, nitrates, acetates, oxalates, acetylacetonates, phosphates in water, an alcohol such as methanol, ethanol and glycerol, or an amine such as ethylenediamine, ethylamine and pyridine, and combinations thereof. In a further embodiment, the dispersion medium selected may comprise polymers such as polyacrylates, polyamines, polyurethanes, polyureas, phenolic resins, amino resins and epoxy resins and combinations thereof, and also corresponding monomer precursors of the polymers mentioned and combinations thereof.

A corresponding process for producing a coated substrate then comprises steps (a) of (re)dispersing the inventive composite luminophore in a dispersion medium, (b) of applying the dispersion to a preferably transparent substrate, and (c) of drying the dispersion applied to the substrate, or allowing the dispersion applied to the substrate to dry. The luminophore particles are preferably applied to the substrate in the form of a transparent and luminescent coating.

Figure 1:
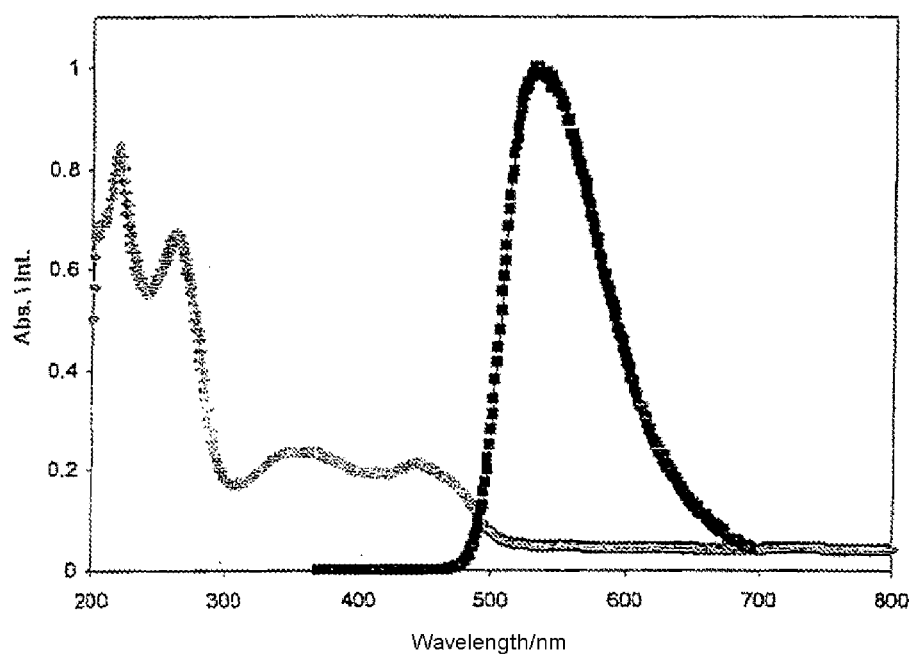
FIG. 1 shows the absorption spectrum and the emission spectrum of an inventive nanoscale composite luminophore, prepared according to Example 3 which follows.

The present invention is illustrated in detail by the nonrestrictive examples which follow.

EXAMPLES

Example 1

Riboflavin phosphate zirconium salt: $Zr(HPO_4)_{2-x}(FMN)_x$: where x=2/"$Zr(FMN)_2$"

160 mg of $Zr(OC_2H_5)_4$ were dissolved in 10 ml of methanol (solution 1). 300 mg of riboflavin 5'-monophosphate sodium salt (Fluka 85%) were dissolved in 30 ml of $H_2O$ (solution 2). Solution 1 was added rapidly to solution 2 at room temperature while stirring vigorously. After stirring for 2 min, the mixture was centrifuged off (25 000 rpm, 15 min) and resuspended in $H_2O$. After centrifuging off again, the mixture was in this way washed once more with $H_2O$ and centrifuged off again. A stable suspension was obtained by resuspending the washed solid in ethanol by means of an ultrasound bath and then centrifuging at 25 000 rpm for 2 min. The centrifugate comprises nanoscale amorphous zirconium riboflavin phosphate particles of the composition $Zr(FMN)_2$ where FMN=riboflavin mononucleotide or riboflavin monophosphate. A composite luminophore was obtained, consisting of riboflavin phosphate as the organic fluorescent dye and $Zr^{4+}$ as the inorganic matrix former.

Example 2

Riboflavin phosphate zirconium salt: $ZrO(HPO_4)_{1-x}(FMN)_x$ where x=1/"ZrO(FMN)"

100 mg of $ZrOCl_2.8H_2O$ were dissolved in 10 ml of $H_2O$ (solution 1). 300 mg of riboflavin 5'-monophosphate sodium salt (Fluka 85%) were dissolved in 30 ml of $H_2O$ (solution 2). Solution 1 was added rapidly to solution 2 at room temperature while stirring vigorously. After stirring for 2 min, the mixture was centrifuged off (25 000 rpm, 15 min) and resuspended in $H_2O$. After centrifuging off again, the mixture was in this way washed once more with $H_2O$ and centrifuged off again. A stable suspension is obtained by resuspending the washed solid in ethanol by means of an ultrasound bath and then centrifuging at 25 000 rpm for 2 min. The centrifugate comprises nanoscale amorphous zirconium riboflavin phosphate particles of the composition ZrO(FMN) where FMN=riboflavin monophosphate. A composite luminophore was obtained, consisting of riboflavin phosphate as the organic fluorescent dye and $Zr^{4+}$ as the inorganic matrix former.

Example 3

Riboflavin Phosphate-Doped Zirconium Phosphate: $ZrO(HPO_4)_{1-x}(FMN)_x$: where x=0.1/"FMN-doped $ZrO(HPO_4)$"

21 mg of $H_3PO_4$ (85%) and 0.2 ml of a riboflavin 5'-monophosphate sodium salt solution (Fluka 85%, 50 mg/1 ml of $H_2O$) were mixed. Subsequently, 2 ml of $H_2O$ and 8 ml of methanol were added. This clear solution was added to 25 ml of $[MeBu_3N][(SO_2CF_3)_2N]$, and the turbidity which arose was dissolved again with 10 ml of ethanol (solution 1). 39 mg of $ZrOCl_2.8H_2O$ were dissolved in 0.5 ml of methanol (solution 2). Solution 1 was heated to 70° C. and stirred vigorously (approx. 1000 rpm). Subsequently, solution 2 was added rapidly. After stirring for 30 min, the mixture was centrifuged off and the resulting solid was washed by resuspending and centrifuging with ethanol, $H_2O$ (twice) and ethanol. The centrifugate comprises nanoscale amorphous zirconium riboflavin phosphate particles of the composition $ZrO(HPO_4)_{1-x}(FMN)_x$: where x=0.1/"FMN-doped $ZrO(HPO_4)$" where FMN=riboflavin mononucleotide or riboflavin monophosphate. A composite luminophore was obtained, consisting of riboflavin phosphate as the organic fluorescent dye and zirconium hydrogen phosphate as the inorganic matrix.

FIG. 1 shows the absorption spectrum (gray) and the emission spectrum (black) of the zirconium phosphate-riboflavin composite luminophore obtained in Example 3.

Figure 2:
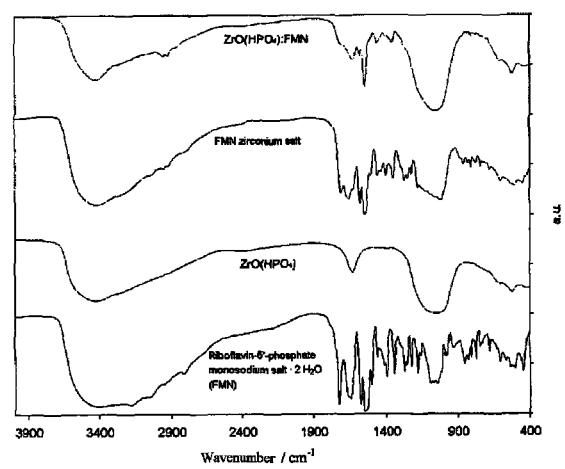
FIG. 2 shows the IR spectra of all components involved in the Zr—$PO_4$-FMN system: $ZrO(HPO_4)$; "FMN-doped ZrO $(HPO_4)$"; "ZrO(FMN)"; pure fluorescent dye FMN; cf. Example 3 which follows.

Proceeding from $Zr(HPO_4)_2$ or $ZrO(HPO_4)$, partial exchange of the phosphate for riboflavin monophosphate is possible where x~0.1 ("FMN-doped $Zr(HPO_4)_2$" or "FMN-doped $ZrO(HPO_4)$"), but also full replacement of the phosphate where x=2 ("$Zr(FMN)_2$") or x=1 ("ZrO(FMN)"). Overall, x can be varied as desired between 0 and 2 or 0 and 1. This is caused by the layer structure of the zirconium phosphate, which is very "tolerant" here. On the basis of analytical data (for example combustion analysis, thermogravimetry, energy-dispersive x-ray analysis), the composition of the noncrystalline compound in the $Zr-PO_4$ system can be restricted to:

idealized formula composition: $Zr(HPO_4)_{2-x}(FMN)_x$ where x=0-2
where FMN: riboflavin monophosphate or idealized formula composition: $ZrO(HPO_4)_{1-x}(FMN)_x$ where x=0-1
where FMN: riboflavin monophosphate FIG. 2 shows the IR spectra of all components involved in the $Zr-PO_4$-FMN system: $ZrO(HPO_4)$; "FMN-doped $ZrO(HPO_4)$"; "ZrO(FMN)"; pure fluorescent dye FMN.

Example 4

Perylene-3,4,9,10-tetracarboxylic acid calcium salt 50 mg of $Ca(NO_3)_2.4H_2O$ were dissolved in 5 ml of $H_2O$ (solution 1). 55 mg of perylene-3,4,9,10-tetracarboxylic acid tetrasodium salt were dissolved in 30 ml of $H_2O$ (solution 2). Solution 1 was added rapidly to solution 2 at room temperature while stirring vigorously. After stirring for 2 min, the mixture was centrifuged off (25 000 rpm, 15 min) and resuspended in $H_2O$. After centrifuging off again, the mixture was in this way washed once more with $H_2O$ and centrifuged off again. A stable suspension is obtained by resuspending the washed solid in ethanol by means of an ultrasound bath and then centrifuging at 25 000 rpm for 2 min. The centrifugate comprises nanoscale particles. A composite luminophore was obtained, consisting of perylene-3,4,9,10-tetracarboxylic acid as the organic fluorescent dye and $Ca^{2+}$ as the inorganic matrix former.

Such composite luminophores with perylene as the organic fluorescent dye are of particular interest owing to the extremely high quantum yield thereof (>95%).

Example 5

Zirconium Phosphate with Rhodamine 21 mg of $H_3PO_4$ (85%) and 0.2 ml of a rhodamine solution (50 mg/1 ml of $H_2O$) were mixed. Subsequently, 2 ml of $H_2O$ and 8 ml of methanol were added. This clear solution was added to 25 ml of $[MeBu_3N][(SO_2CF_3)_2N]$, and the turbidity which arose was dissolved again with 10 ml of ethanol (solution 1). 39 mg of $ZrOCl_2.8H_2O$ were dissolved in 0.5 ml of methanol (solution 2). Solution 1 was heated to 70° C. and stirred vigorously (approx. 1000 rpm). Subsequently, solution 2 was added rapidly. After stirring for 30 min, the mixture was centrifuged off and the resulting solid was washed by resuspending and centrifuging with ethanol, $H_2O$ (twice) and ethanol. Composite luminophore was obtained, consisting of amorphous zirconium phosphate as the inorganic matrix and rhodamine as the organic fluorescent dye.

Example 6

Lanthanum Phosphate with Riboflavin 185 mg of $LaCl_3.6H_2O$ were dissolved in 10 ml of $H_2O$ (solution 1). 300 mg of riboflavin 5'-monophosphate sodium salt and 20 mg of $H_3PO_4$ (85%) were dissolved in 30 ml of $H_2O$ (solution 2). Solution 1 was added rapidly to solution 2 at room temperature while stirring vigorously. After stirring for 2 min, the mixture was centrifuged off (25 000 rpm, 15 min) and resuspended in $H_2O$. After centrifuging off again, the mixture was in this way washed again with $H_2O$ and centrifuged off once again. A stable suspension was obtained by resuspending the washed solid in ethanol by means of an ultrasound bath and then centrifuging at 25 000 rpm for 2 min. The centrifugate comprises a composite luminophore consisting of crystalline lanthanum phosphate (LaPO$_4$) as the inorganic matrix and riboflavin as the organic fluorescent dye.

Example 7

Tetra(o-amidophosphonatophenyl)porphyrin zirconium salt 65 mg of tetra(o-amidophosphonatophenyl)porphyrin tetrasodium salt (0.06 mmol) were dissolved in 5 ml of EtOH, 5 ml of MeOH and 3 ml of H$_2$O. This clear solution was added to 15 ml of [MeBu$_3$N][(SO$_2$CF$_3$)$_2$N], and the turbidity which arose was dissolved again with 5.5 ml of MeOH (solution 1). 20 mg of ZrOCl$_2$.8H$_2$O (0.06 mmol) were dissolved in 1.5 ml of methanol (solution 2).

Solution 1 was heated to 40° C. and stirred vigorously (approx. 1000 rpm). Subsequently, solution 2 was added rapidly. After stirring for 20 min, the mixture was centrifuged off and the resulting solid was washed by resuspending and centrifuging with ethanol and H$_2$O (3 times). A composite luminophore was obtained, consisting of tetra(o-amidophosphonatophenyl)porphyrin as the organic fluorescent dye and Zr$^{4+}$ as the inorganic matrix former.

Example 8

Umbelliferone Phosphate Zirconium Salt 26 mg of umbelliferone phosphate disodium salt (0.1 mmol) were dissolved in 5 ml of EtOH, 5 ml of MeOH and 3 ml of H$_2$O. This clear solution was added to 15 ml of [MeBu$_3$N][(SO$_2$CF$_3$)$_2$N] and the turbidity which arose was dissolved again with 5.5 ml of MeOH (solution 1). 20 mg of ZrOCl$_2$.8H$_2$O (0.06 mmol) were dissolved in 1.5 ml of methanol (solution 2).

Solution 1 was heated to 40° C. and stirred vigorously (approx. 1000 rpm). Subsequently, solution 2 was added rapidly. After stirring for 20 minutes, the mixture was centrifuged off and the resulting solid was washed by resuspending and centrifuging with ethanol and H$_2$O (3 times). A composite luminophore was obtained, consisting of umbelliferone phosphate as the organic fluorescent dye and Zr$^{4+}$ as the inorganic matrix former.

We claim:

1. A composite composite luminophore comprising an inorganic matrix and an organic fluorescent dye,
   wherein the inorganic matrix is formed from an inorganic compound selected from the group consisting of sparingly soluble metal carbonates, sparingly soluble metal phosphates, sparingly soluble metal sulfates and mixtures thereof,
   wherein the inorganic compound in each case contains one or more metal cations which may be the same or different and are selected from the group consisting of Li, Na, K, Rb, Cs, Mg, Ca, Sr, Ba, Sc, Y, La, Ti, Zr, V, Nb, Ta, Zn, B, Al, Ga, In, Ge, Bi, Pb, the lanthanoids and combinations thereof, and
   wherein the organic fluorescent dye has one or more functional groups selected from the group consisting of hydroxyl groups, sulfate groups, phosphate groups, phosphonic acid groups, phosphinic acid groups, carboxylate groups, silicate groups, borate groups, and combinations thereof, by means of which the fluorescent dye is incorporated into the inorganic matrix.

2. The composite luminophore as claimed in claim 1, wherein the organic fluorescent dye is selected from the group consisting of 1,1'-diethyl-2,2'-cyanine iodide, 1,2-diphenylacetylene, 1,4-diphenylbutadiene, 1,4-diphenylbutadiene, 1,6-diphenylhexatriene, 2,5-diphenyloxazole, 2-methylbenzoxazole, 4',6-diamidino-2-phenylindole, (DAPI), 4-(dicyanomethylene)-2-methyl-6-(p-dimethylaminostyryl)-4H-pyran (DCM), 4-dimethylamino-4'-nitrostilbene, 5,10,15-triphenylcorrole, 5,10,15-tris(pentafluorophenyl)corrole, 5,10-diarylchlorin, copper 5,10-diarylchlorin, copper 5,10-diaryloxochlorin, magnesium 5,10-diaryloxochlorin, 5,10-diaryloxochlorin, zinc 5,10-diarylchlorin, zinc 5,10-diaryloxochlorin, 7-benzylamino-4-nitrobenz-2-oxa-1,3-diazole, 7-methoxycoumarin-4-acetic acid, 9,10-bis(phenyl-ethynyl) anthracene, 9,10-diphenylanthracene, acridine orange, acridine yellow, adenine, anthracene, anthraquinone, auramine O, azobenzene, bacteriochlorophyll A, benzoquinone, beta-carotene, bilirubin, biliverdin dimethyl ester, biphenyl, bis(5-mesityldipyrrinato)zinc, bis(5-phenyldipyrrinato)zinc, boron subphthalocyanine chloride, chlorin E6, chlorophyll A, chlorophyll B, cis-stilbene, coumarin and derivatives thereof, cresyl violet perchlorate, cryptocyanine, crystal violet, cytosine, dansylglycine, diprotonated tetraphenylporphyrin, eosin and derivatives thereof, ethyl (p-dimethylamino)benzoate, ferrocene, fluorescein and derivatives thereof, guanine, hematine, histidine, Hoechst 33258, indocarbocyanine and derivatives thereof, lucifer yellow CH, magnesium octaethylporphyrin, magnesium phthalocyanine, magnesium tetramesitylporphyrin, magnesium tetraphenylporphyrin, malachite green, merocyanine, N,N'-difluoroboryl-1,9-dimethyl-5-(4-iodophenyl)dipyrrin, N,N'-difluoroboryl-1,9-dimethyl-5-[(4-(2-trimethylsilylethynyl), N,N'-difluoroboryl-1,9-dimethyl-5-phenyldipyrrin, tetraphenylporphyrin, naphthalene, nile blue, nile red, octaethylporphyrin, oxacarbocyanine and derivatives thereof, oxazine and derivatives thereof, p-quaterphenyl, p-terphenyl, perylene and derivatives thereof, phenol, phenylalanine, phenyldipyrrin, pheophorbide, phthalocyanine, pinacyanol iodide, piroxicam, porphin, proflavin, protoporphyrin IX dimethyl ester, pyrene, pyropheophorbide and derivatives thereof, pyrrole, quinine, rhodamine and derivatives thereof, riboflavin, bengal red, squarylium dye III, TBP-beta-octa(COOBu)-Fb, TBP-beta-octa(COOBu)-Pd, TBP-beta-octa(COOBu)-Zn, TBP-meso-tetraphenyl-beta-octa(COOMe)-Fb, TBP-meso-tetraphenyl-beta-octa(COOMe)-Pd, TBP-meso-tetraphenyl-beta-octa(COOMe)-Zn, TCPH-meso-tetra(4-COOMe-phenyl)-Fb, TCPH-meso-tetra(4-COOMe-phenyl)-Pd, TCPH-meso-tetra(4-COOMe-phenyl)-Zn, tetra-t-butylazaporphin, tetra-t-butylnaphthalocyanine, tetrakis(2,6-dichlorophenyl) porphyrin, tetrakis(o-aminophenyl)porphyrin, tetramesitylporphyrin, tetraphenylporphyrin, tetraphenylsapphyrin, thiacarbocyanine and derivatives thereof, thymine, trans-stilbene, tris(2,2'-bipyridyl)ruthenium(II), tryptophan, tyrosine, uracil, vitamin B12, zinc octaethylporphyrin, phthalocyanine and derivatives thereof, porphyrin and derivatives thereof, and umbelliferone,
   wherein any of the organic fluorescent dyes that do not have at least one functional group selected from the group consisting of a hydroxyl group, sulfate group, phosphate group, phosphonic acid group, phosphinic acid group, carboxylate group, silicate group or borate group have been modified with at least one of said functional groups.

3. The composite luminophore as claimed in claim 1, wherein the organic fluorescent dye is selected from the group consisting of riboflavin 5'-monophosphate sodium salt, rhodamine, perylene, coumarin and umbelliferone, wherein any of the organic fluorescent dyes that do not have at least one functional group selected from the group consisting of a hydroxyl group, sulfate group, phosphate group, phosphonic acid group, phosphinic acid group, carboxylate group, silicate group or borate group have been modified with at least one of said functional groups.

4. The composite luminophore as claimed in claim 1, wherein the inorganic matrix is crystalline.

5. The composite luminophore as claimed in claim 1, wherein the inorganic matrix is x-ray-amorphous.

6. The composite luminophore as claimed in claim 1, wherein the functional group through which the fluorescent dye is incorporated into the inorganic matrix is selected from the group consisting of —COOH, —OH, —P(O)$_2$OH, —OP(O)$_2$OH, —S(O)$_2$OH and anions thereof.

7. The composite luminophore as claimed in claim 1, wherein the inorganic matrix is formed from a compound selected from the group consisting of $MgCO_3$, $CaCO_3$, $SrCO_3$, $BaCO_3$, $PbCO_3$, $MgSO_4$, $CaSO_4$, $SrSO_4$, $BaSO_4$, $PbSO_4$, $Mg_3(PO_4)_2$, $Ca_3(PO_4)_2$, $Sr_3(PO_4)_2$, $Ba^3(PO_4)_2$, $Mg_3(PO_4)_2$, $LaPO_4$, $ScPO_4$, $GaPO_4$, $InPO_4$, $ZrO(HPO_4)$, $ZrO(H_2PO_4)_2$, $Zr_3(PO_4)_4$, $Zr(HPO_4)_2$, $Zr(H_2PO_4)_4$, and combinations thereof.

8. The composite luminophore as claimed in claim 7, wherein the inorganic matrix is formed from a compound selected from the group consisting of $CaCO_3$, $LaPO_4$, $ZrO(HPO_4)$, $ZrO(H_2PO_4)_2$, $Zr_3(PO_4)_4$, $Zr(HPO_4)_2$, and $Zr(H_2PO_4)_4$.

9. The composite luminophore as claimed in claim 1, wherein the composite luminophore is based on $Zr(HPO_4)_{2-x}(FMN)_x$, where x is 0-2 and FMN is riboflavin monophosphate, or $ZrO(HPO_4)_{1-x}(FMN)_x$, where x is 0-1 and FMN is riboflavin monophosphate.

10. The composite luminophore as claimed in claim 9, wherein the composite luminophore is $Zr(HPO_4)_{2-x}(FMN)_x$, where x is 2 ("Zr(FMN)$_2$"); $ZrO(HPO_4)_{1-x}(FMN)_x$, where x is 1 ("ZrO(FMN)"); or and $ZrO(HPO_4)_{1-x}(FMN)_x$, where x=0.1 ("FMN-doped ZrO(HPO$_4$)").

11. The composite luminophore as claimed in claim 1, wherein the inorganic matrix is further doped with one or more cations and/or anions.

12. The composite luminophore as claimed in claim 11, wherein the inorganic matrix has been doped with a lanthanoid selected from the group consisting of Ce, Pr, Nd, Sm, Eu, Gd, Tb, Dy, Ho, Er, Tm, Yb and Lu; a transition metal selected from the group consisting of Cr, Mn, Cu, Zn, Y, Ag and Cd; a main group element selected from the group consisting of Sn, Sb, Pb and Bi; a complex anion selected from the group consisting of $[VO4]^{3-}$, $[MoO4]^{3-}$ and $[WO4]^{3-}$; or combinations thereof.

13. The composite luminophore as claimed in claim 1, wherein the composite luminophore has a particle diameter ranging from 1 to 100 nm.

14. A process for preparing the composite luminophore as claimed in claim 1, comprising the steps of
(a) providing a solution of an organic fluorescent dye having one or more functional groups selected from the group consisting of hydroxyl groups, sulfate groups, phosphate groups, phosphonic acid groups, phosphinic acid groups, carboxylate groups, silicate groups, borate groups, and combinations thereof,
(b) providing a solution of a soluble metal salt comprising metal cations which may be the same or different and are selected from the group consisting of Li, Na, K, Rb, Cs, Mg, Ca, Sr, Ba, Sc, Y, La, Ti, Zr, V, Nb, Ta, Zn, B, Al, Ga, In, Ge, Bi, Pb the lanthanoids, and combinations thereof, and
(c) combining the two solutions while stirring to precipitate the composite luminophore.

15. The method as claimed in claim 14, further comprising the step of (d) isolating and/or purifying of the precipitated composite luminophore.

16. The method as claimed in claim 14, wherein the solution of an organic fluorescent dye further comprises at least one anion selected from the group consisting of hydroxide, sulfate, phosphate, carbonate, carboxylate, silicate, borate, and combinations thereof.

17. A method of coating a composite luminophore, comprising:
coating the composite luminophore as claimed in claim 1 onto a substrate.

18. The method as claimed in claim 17, wherein the substrate is selected from the group consisting of a paper substrate, polymer substrate, glass substrate, metal substrate and ceramic substrate.

19. A method of embedding a composite luminophore, comprising:
embedding the composite luminophore as claimed in claim 1 into a substrate.

20. The method as claimed in claim 19, wherein the substrate is selected from the group consisting of a paper substrate, polymer substrate, glass substrate, metal substrate and ceramic substrate.

* * * * *